(12) United States Patent
Yamauchi (10) Patent No.: US 7,819,531 B2
(45) Date of Patent: Oct. 26, 2010

(54) PROJECTOR

(75) Inventor: Kentaro Yamauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 483 days.

(21) Appl. No.: 11/871,476

(22) Filed: Oct. 12, 2007

(65) Prior Publication Data

US 2008/0094587 A1 Apr. 24, 2008

(30) Foreign Application Priority Data

Oct. 20, 2006 (JP) ............................. 2006-286034

(51) Int. Cl.
*G03B 21/20* (2006.01)
(52) U.S. Cl. .............................. 353/85; 353/37; 353/98; 353/119; 353/122; 315/209 R; 315/224; 315/225; 315/226; 315/291; 315/294; 315/307; 315/308; 313/113; 313/114; 313/115; 313/458; 313/460
(58) Field of Classification Search .................. 353/37, 353/85, 98, 119, 122; 315/224, 291, 209 R, 315/225, 226, 246, 294, 307, 308; 313/113, 313/114, 115, 458, 460
See application file for complete search history.

(56) References Cited

U.S. PATENT DOCUMENTS 6,175,199 B1 * 1/2001 Moskowitz ................. 315/291
6,781,326 B2 * 8/2004 Stack ......................... 315/291
7,288,899 B2 * 10/2007 Akiyama .................... 315/291
2003/0098659 A1 * 5/2003 Okamoto et al. ............ 315/291
2006/0066261 A1 * 3/2006 Rahmane et al. ............ 315/291
2008/0246410 A1 10/2008 Kikuchi

FOREIGN PATENT DOCUMENTS

| JP | A-6-163167 | 6/1994 |
| JP | A-2005-19141 | 1/2005 |
| JP | A-2006-4919 | 1/2006 |
| WO | WO 2004/086453 A1 | 10/2004 |
| WO | WO 2005/074332 A1 | 8/2005 |

* cited by examiner

*Primary Examiner*—Georgia Y Epps
*Assistant Examiner*—Sultan Chowdhury
(74) *Attorney, Agent, or Firm*—Oliff & Berridge, PLC (57) ABSTRACT

A light source device includes first and second electrodes, an arc tube having a main body section having a discharge space in which the first and second electrodes are disposed with a distance and a sealing section disposed on each of the both ends of the main body section, a primary reflecting mirror disposed on the side of the first electrode, a secondary reflecting mirror disposed on the side of the second electrode, and a current drive device that generates an alternating current for causing the discharge between the first and second electrodes, and power control by controlling the alternating current so that supplying energy in an anodic term of the first electrode becomes smaller than supplying energy in a cathode term.

8 Claims, 8 Drawing Sheets

PROJECTOR

BACKGROUND

1. Technical Field

The present invention relates to a light source device having a pair of electrodes, a primary reflecting mirror, and a secondary reflecting mirror, and a projector using the light source.

2. Related Art

As a light source lamp used for projectors, for example, there is known a light source lamp having an auxiliary mirror in order for utilizing the light from an arc tube as efficiently as possible (see WO-2004-086451). In this case, as a result of using a secondary reflecting mirror such as an auxiliary mirror, there are some cases in which the temperature of the auxiliary mirror side electrode out of the pair of electrodes in the arc tube is raised, and accordingly, there is known a device of controlling the temperature by increasing the thermal capacity of the auxiliary side electrode (see WO-2004-086453).

However, in the light source using the auxiliary mirror, under the influence of the shape of the arc tube and so on, the reflected light by the secondary reflecting mirror do not necessarily enter between the pair of electrodes as intended. In this case, in particular, one of the pair of electrodes disposed on the side opposite to the auxiliary mirror might be irradiated with a part of the reflected light, which might become a factor for causing a damage on and deterioration of the electrode.

More specific explanations about this point will hereinafter be presented. In the light source device, the electrode on the anode side, which becomes the side of receiving electrons, is particularly damaged when the discharge between the pair of electrodes occurs. In this case, even if an equal alternating current is applied to the pair of electrodes, the influence of the irradiation by the reflected light from the auxiliary mirror is added with the damage by the discharge, and accordingly, the electrode more significantly influenced by the reflected light might be more seriously damaged and early deterioration might be incurred.

SUMMARY

Therefore, an advantage of the invention is to provide a light source device capable of reducing the early deterioration of the electrode caused by the influence of the reflected light from a secondary reflecting mirror such as the auxiliary mirror and a projector having long life owing to using the light source device.

According to an aspect of the invention, there is provided a light source device including: first and second electrodes that produces luminescence by discharge; an arc tube having a main body section having a discharge space in which the first and second electrodes are disposed with a distance and a sealing section disposed on each of the both ends of the main body section; a primary reflecting mirror disposed on the side of the first electrode, and that reflects a light generated by discharge between the first and second electrodes to emit the light towards an area to be illuminated; a secondary reflecting mirror disposed on the side of the second electrode facing the primary reflecting mirrors that reflects the light towards the side of the primary reflecting mirror; and a current drive device that generates an alternating current for causing the discharge between the first and second electrodes, and that performs power control by controlling the alternating current so that supplying energy in an anodic term of the first electrode becomes smaller than supplying energy in a cathode term.

According to the light source device described above, by the control of the alternating current in the current drive device, in the discharge between the first and second electrodes, the power control is performed so that the supply energy in the anodic term of the first electrode becomes smaller than the supply energy in the cathode term. Therefore, even in the case in which the electrodes are influenced by the illumination of the reflected light from the auxiliary mirror in addition to the damage by the discharge, the difference in the damage caused on the both electrodes by the discharge and the reflected light is uniformized, thus the early deterioration of the electrodes can be reduced.

Further, according to specific aspect of the invention, the current drive device performs the power control by adjusting a time ratio between the anodic term and the cathode term of the first electrode. Thus, even if there is no difference in the absolute value of the current between the anodic term and the cathode term, the difference in the supply energy between the anodic term and the cathode term of the first electrode can be provided.

Further, according to specific aspect of the invention, the current drive device performs the power control by adjusting a current ratio between the current in the anodic term and the current in the cathode term of the first electrode. In also this way, a predetermined difference in the supply energy between in the anodic term and in the cathode term of the first electrode can be provided.

Further, according to specific aspect of the invention, the primary reflecting mirror and the secondary reflecting mirror have reflecting curved surfaces substantially axisymmetric with respective to an optical axis, and electrode axes of the first and second electrodes are disposed substantially identical to the optical axis. Thus, in the discharge, the emission center between the first and second electrodes can be placed at a desired position, and the light can efficiently be utilized by the primary mirror and the secondary mirror, and can be emitted to an appropriate area to be illuminated.

Further, according to an aspect of the invention, there is provided a projector including: either one of the light source devices described above; a light modulation device illuminated by an illuminating light flux from the light source device; and a projection optical system that projects an image obtained via the light modulation device. Thus, the projector according to this aspect of the invention, which uses either one of the light source devices described above, has a light source having lengthened life.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

First Embodiment

Figure 1:
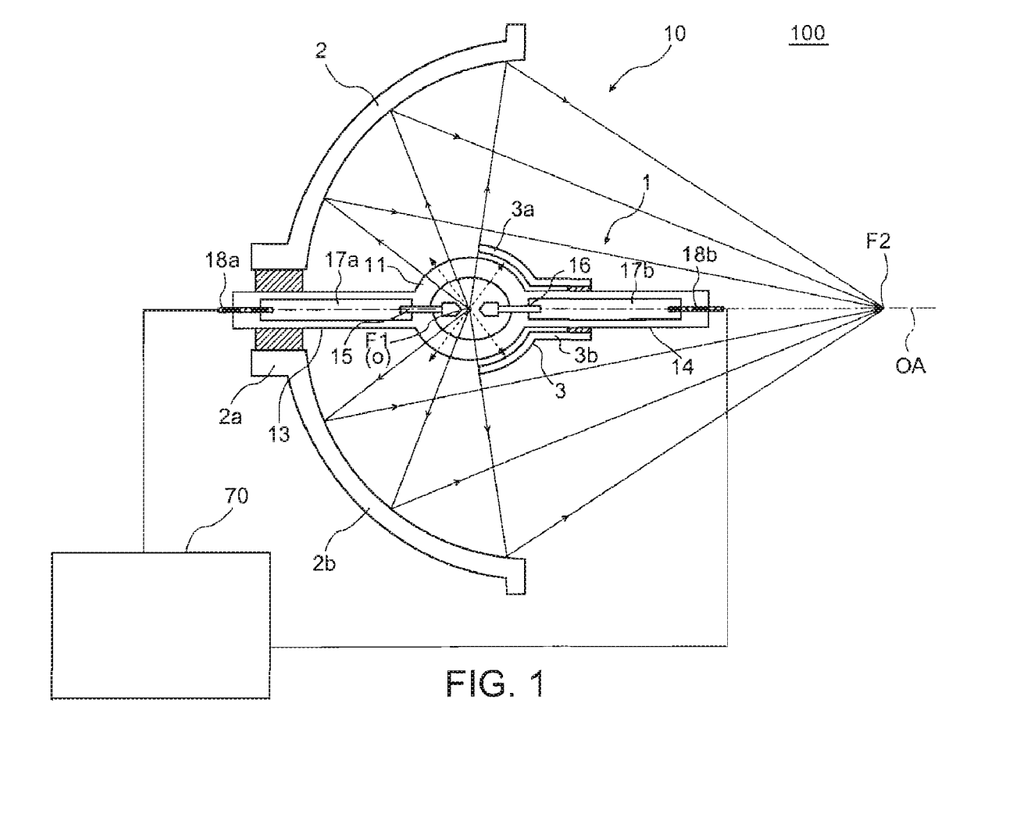
FIG. 1 is a cross-sectional view for explaining a light source device having a secondary reflecting mirror according to a first embodiment.

FIG. 1 is a cross-sectional view for explaining a light source device according to the first embodiment of the invention. The light source device 100 of the present embodiment is provided with a light source unit 10 and a current drive device 70. The light source unit 10 has an arc tube 1 of a discharge emission type, a reflector 2 as an elliptical primary reflecting mirror, and a secondary mirror 3 as a spherical secondary reflecting mirror. The current drive device 70 is an electric circuit for supplying the light source unit 10 with an alternating current to make it emit light in a desired condition.

In the light source unit 10, the arc tube 1 is formed of a translucent quartz glass tube with a center portion bulging to form a spherical shape, and is provided with a main body section 11 for emitting light for illumination and first and second sealing sections 13, 14 extending on both ends of the main body section 11.

The inside of a discharge space 12 formed by the main body section 11 encapsulates a pair of electrodes composed of first and second electrodes 15, 16 made of tungsten and disposed with a predetermined distance between them, and a gas as a discharge medium including a rare gas, a metal halide, and so on. On the other hand, inside the sealing sections 13, 14, there are inserted metal foils 17a, 17b made of molybdenum electrically connected to the first and second electrodes 15, 16 provided to the main body section 11, and the tips of the both sealing sections 13, 14 are sealed with glass materials or the like. Then, when the current drive device 70 applies an alternating-current voltage to the lead wires 18a, 18b respectively connected to the metal foils 17a, 17b (the details will be described with reference to FIG. 4), arc discharge is caused between the pair of electrodes 15, 16, and the main body section 11 emits light with high intensity. Here, as is clear form FIG. 1, the reflector 2 is disposed on the side of the first electrode 15, and the secondary mirror 3 is disposed on the side of the second electrode 16 facing the reflector 2. Therefore, the first electrode 15 should be disposed across the main body section 11 from the secondary mirror 3.

A substantially half of the main body section 11 of the arc tube 1 on the front side in the beam emitting direction is covered by the secondary mirror 3. The secondary mirror 3 is composed of a secondary reflecting section 3a for getting the beam emitted from the main body section 11 of the arc tube 1 towards the front back to the main body section 11, and a support section 3b fixed to the periphery of the second sealing section 14 in the condition of supporting a root section of the secondary reflecting section 3a. The support section 3b has the second sealing section 14 inserted therein, and aligns the secondary reflecting section 3a with the main body section 11.

The reflector 2 is an integrally molded component made of quartz glass composed of a neck-like section 2a through which the first sealing section 13 of the arc tube 1 is inserted and a primary reflecting section 2b having an elliptically curved surface expanding from the neck-like section 2a. The neck-like section 2a has the first sealing section 13 inserted therein, and aligns the primary reflecting section 2b with the main body section 11.

The arc tube 1 is disposed along a system optical axis OA corresponding to an optical axis of the primary reflecting section 2b so that the emission center O between the first and second electrodes 15, 16 inside the main body section 11 becomes identical to the position of the primary focus F1 of the elliptically curved surface of the primary reflecting section 2b. When lighting the arc tube 1, the beams emitted from the main body section 11 are reflected by the primary reflecting section 2b, or reflected by the secondary reflecting section 3a and then further reflected by the primary reflecting section 2b, to be formed as beams converged on a position of the secondary focus F2 of the elliptically curved surface. In other words, the reflector 2 and the secondary mirror 3 have reflecting curved surfaces substantially axisymmetric with respect to the system optical axis OA, and the pair of electrodes 15, 16 is disposed so that the electrode axis, the center of the axis thereof, becomes substantially identical to the system optical axis OA.

Figure 2:
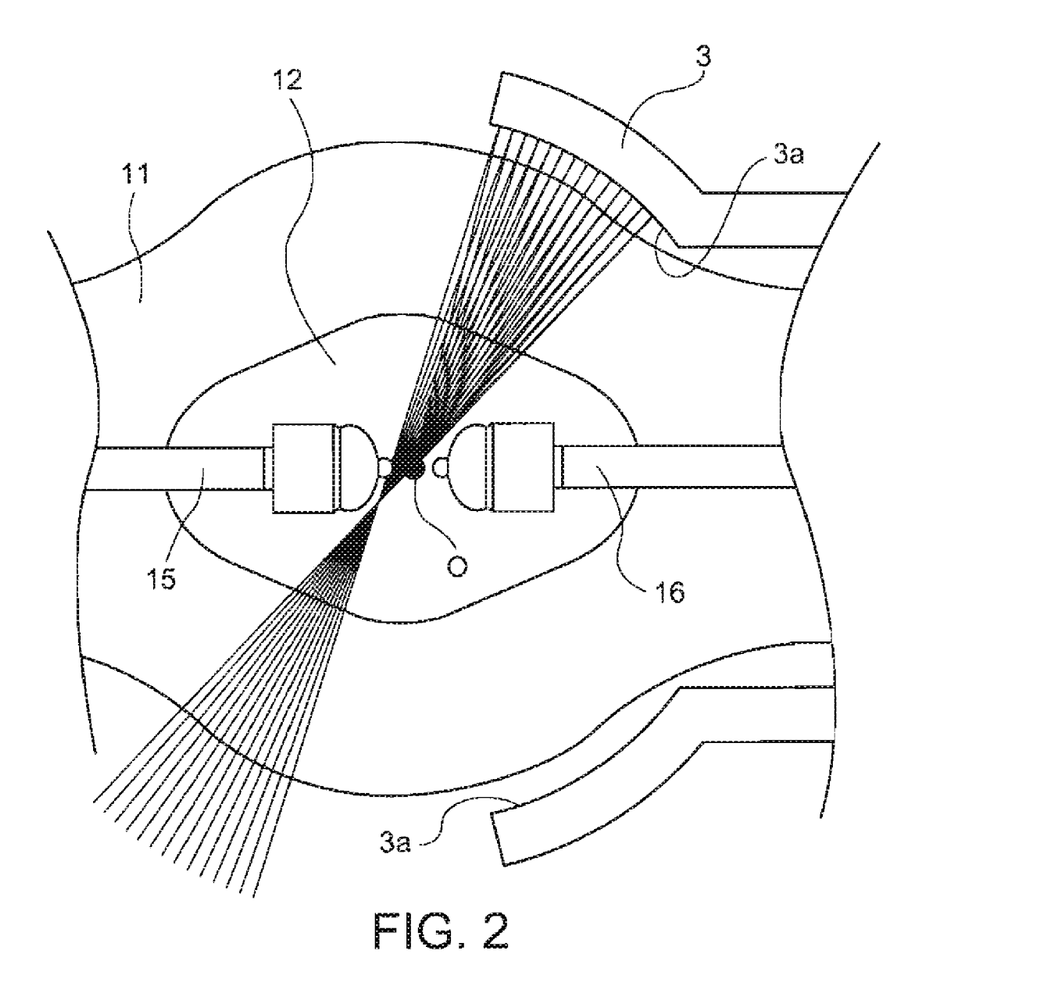
FIG. 2 is an enlarged cross-sectional view for explaining the reflected light by the secondary reflecting mirror according to the first embodiment.

FIG. 2 is an enlarged cross-sectional view for explaining the reflected light by the secondary mirror 3 according to the present embodiment. As explained with reference to FIG. 1, the lights caused by arc discharge generated at the emission center O between the pair of electrodes 15, 16 expand radially from the vicinity of the emission center O. As shown in FIG. 2, out of the beams, the lights extending towards the front of the proceeding direction of the light, namely towards the side of the secondary mirror 3, are reflected by the secondary mirror 3, and returned towards the rear side of the proceeding direction of the light, namely towards the side of the emission center O. Therefore, the lights expanding towards the front side should also be returned towards the side of the reflector 2 shown in FIG. 1 after reflected by the secondary mirror 3, and usually used effectively. However, in this case, some of the reflected beams reflected by the secondary mirror 3 are changed in the light paths in accordance with the shape of the main body section 11, and do not return to the vicinity of the emission center O. Such reflected beams not only fail to be effectively used, but illuminate particularly the first electrode 15 out of the first and second electrodes 15, 16. On the other hand, the peripheries of the tips of the first and second electrodes 15, 16 are damaged by the arc discharge, which causes the deterioration, and further, if the reflected beams from the secondary mirror 3 enter the first electrode 15, the deterioration of the first electrode 15 is accelerated.

Figure 3:
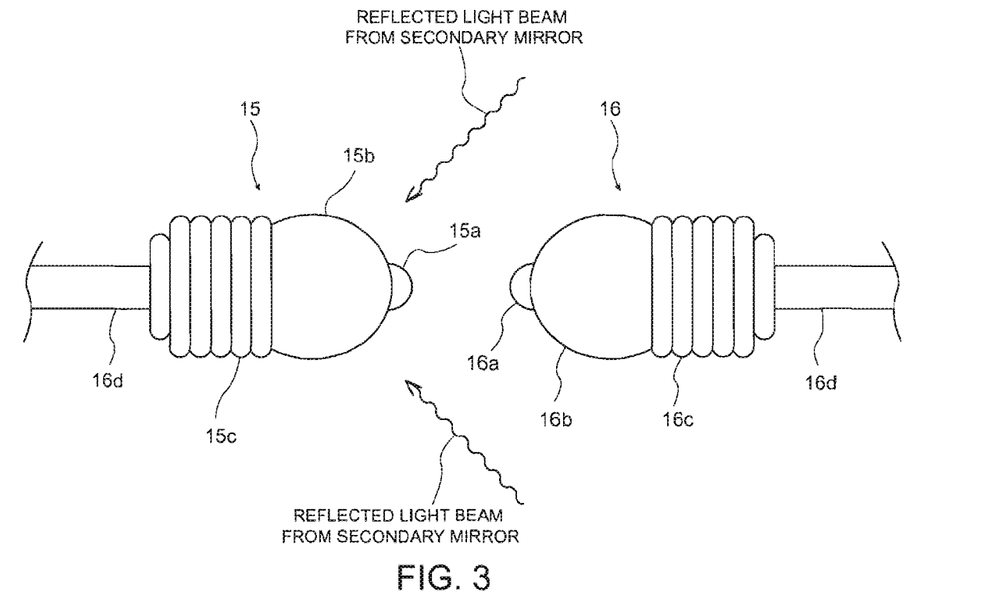
FIG. 3 is an enlarged view showing an example of the peripheries of the tips of a pair of electrodes according to the first embodiment.

FIG. 3 is an enlarged view of the peripheries of the tips of the first and second electrodes 15, 16. The first and second electrodes 15, 16 are composed of tip sections 15a, 16a, welded large-diameter sections 15b, 16b, coil sections 15c, 16c, and shaft sections 15d, 16d, respectively. The peripheries of the tips of the first and second electrodes 15, 16 are formed by melting tungsten materials wound around the shaft sections 15d, 16d, respectively. Specifically, by the melting process, the welded large-diameter sections 15b, 16b are formed, and further, the tip sections 15a, 16a are formed on the tips thereof. In this case, out of the tungsten materials thus wound around, residual parts thereof remaining unmelted form the coil sections 15c, 16c, respectively. Since the block-like welded large-diameter sections 15b, 16b are provided, the first and second electrodes 15, 16 can have large thermal capacities.

The tip sections 15a, 16a are for determining the interelectrode distance for the discharge in the arc tube 1, and are sections for mainly receiving the electrons in the case of the discharge. In this case, the first and second electrodes 15, 16 are both damaged by the current in the arc discharge at the tip sections 15a, 16a. In this case, the damage particularly to the anode, which becomes a side of receiving the electrons, becomes greater, and if the alternating current is used, the polarities of the first and second electrodes 15, 16 are periodically switched, and the both sides can be the anode side and also the cathode side accordingly.

On the other hand, the damage caused by the part of the reflected beams reflected by the secondary reflecting section 3a described above out of the beams generated by the arc discharge heavily influences particularly to the side of the tip section 15a of the side of the first electrode 15 out of the tip sections 15a, 16a as explained above with reference to FIG. 2, and becomes a factor for deteriorating the tip section 15a.

In the present embodiment, in order for suppressing the early deterioration of the pair of electrodes 15, 16 as a whole caused by such a deterioration phenomenon, difference in the supplied energy between the first and the second electrodes 15, 16 is provided by the current drive device 70 to reduce the damage to the first electrode 15, thereby balancing the damages the electrodes 15, 16 receive.

Figure 4:
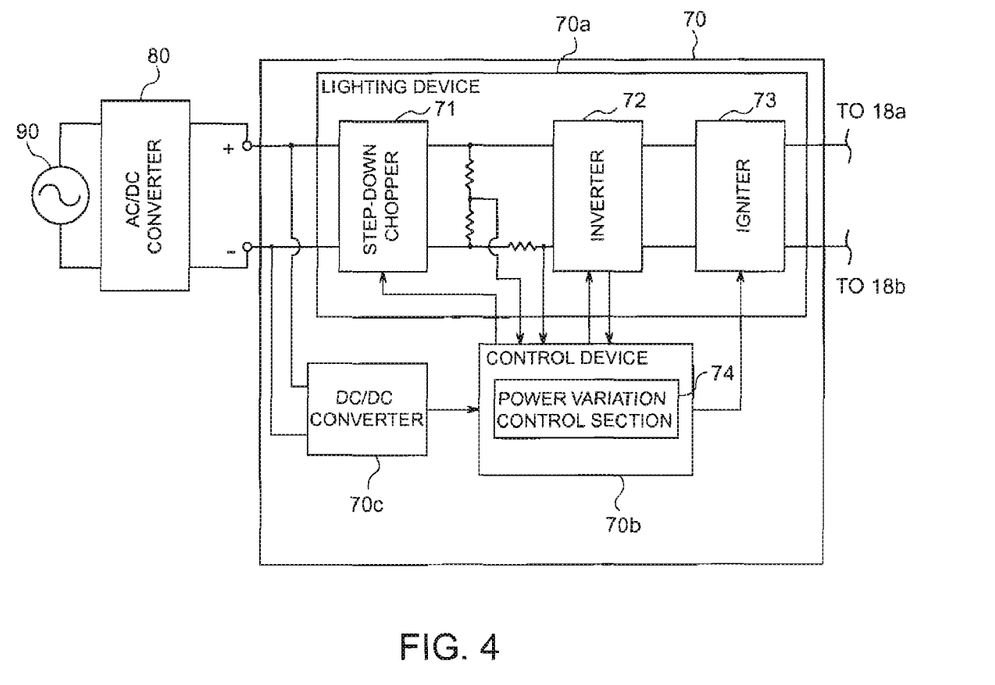
FIG. 4 is a block diagram schematically showing a configuration of a current drive device according to the first embodiment.

FIG. 4 is a block diagram schematically showing a configuration of the current drive device 70. The current drive device 70 generates the alternating current for performing discharge between the pair of electrodes 15, 16 shown in FIG. 1, for example, and at the same time, controls the alternating current. The current drive device 70 includes a lighting device 70a, a control device 70b, and a DC/DC converter 70c. It should be noted that, the case in which the current drive device 70 uses an external power supply will be explained as an example. Specifically, the current drive device 70 is connected to an AC/DC converter 80, and the AC/DC converter 80 is connected to a commercial power supply 90. The AC/DC converter 80 converts the alternating current supplied from the commercial power supply 90 into a direct current.

The lighting device 70a is a part for driving the light source unit 10 shown in FIG. 1 to lights and as shown in FIG. 4, includes a step-down chopper 71, an inverter 72, and an igniter 73.

The step-down chopper 71 is supplied with a direct-current voltage from the AC/DC converter 80, steps down the input voltage into an appropriate direct-current voltage, and supplies it to the inverter 72. The step-down chopper 71 is controlled by the control device 70b to adjust the duty ratio (a ratio between the ON time per unit time period and the OFF time per unit time period) of a built-in switching element. Thus, the output voltage from the step-down chopper 71 is adjusted.

The inverter 72 is a part for converting the direct current supplied from the step-down chopper 71 into an alternating current with a predetermined frequency, and supplies it to the light source unit 10 shown in FIG. 1. The inverter 72 is controlled by the control device 70b, and the timing with which two pairs of switching elements are alternately turned ON or OFF is adjusted. Thus, the duty ratio and the ratio between the positive voltage and the negative voltage of the output waveform from the inverter 72 can be adjusted.

The igniter 73 includes a step-up circuit not shown, and is controlled by the control device 70b to apply a high-voltage pulsed voltage between the pair of electrodes 15, 16 shown in FIG. 1 to cause dielectric breakdown at the start-up of the light source unit 10, thus creating the discharge path.

The control device 70b is formed, for example, of a microprocessor, and for controlling the drive of the lighting device 70a. Further, as shown in FIG. 4, the control device 70b is driven with an appropriate drive voltage generated by the DC/DC converter 70c.

The control device 70b has various kinds of mechanisms for performing control, and here, as one of such mechanisms, a power variation control section 74 is particularly provided as shown in FIG. 4. The power variation control section 74 adjusting the steep-down chopper 71, inverter 72, and so on along a predetermined control program, thereby controlling the drive power supplied from the lighting device 70a to the lead wires 18a, 18b of the light source unit 10 shown in FIG. 1. For example, the amplitude of the current is adjusted by controlling the step-down chopper 71 to adjust the output voltage, further, for example, the time periods of the anode and the cathode, and the maximum absolute value of the current in the anode and cathode terms can be adjusted by controlling the inverter 72 to adjust the duty ratio and the ratio between the positive voltage and the negative voltage of the output waveform. Thus, various adjustments of the alternating current supplied to the light source unit 10 shown in FIG. 1.

Going back to FIG. 1, when the alternating-current voltage is applied by the current drive device 70 in the arc tube 1, the dielectric breakdown is caused, the discharge path is formed, and the arc discharge occurs between the first and second electrodes 15, 16 as already described. By the discharge, the temperature in the discharge space 12 rises, the gas as the discharge medium is heated to be vaporized, and the emission phenomenon occurs at the emission center O and in the periphery thereof. Here, since the current drive device 70 has the configuration explained with reference to FIG. 4, it can control (the details will be described later with reference to FIG. 5 and so on) the alternating current to be generated to be the desired one when performing the discharge between the first and second electrodes 15, 16.

In the above explanations, as already described, although the damage in the electrode as the anode side becomes greater out of the electrodes 15, 16 in the arc discharge, since the current from the current drive device 70 is an alternating current, and accordingly the anode and the cathode are periodically switched, both of the electrodes 15, 16 have possibilities to become the anode, which is more seriously damaged by the arc discharge.

On the other hand, in the arc discharge, there are some cases in which a part of the reflected beams from the secondary mirror 3 further illuminates particularly the side of the first electrode 15 (see FIG. 2) out of the electrodes 15, 16 to make the damage more serious, thus accelerating the deterioration. In the present embodiment, in consideration of the above circumstances, the power control by the current drive device 70 is performed.

Figure 5:
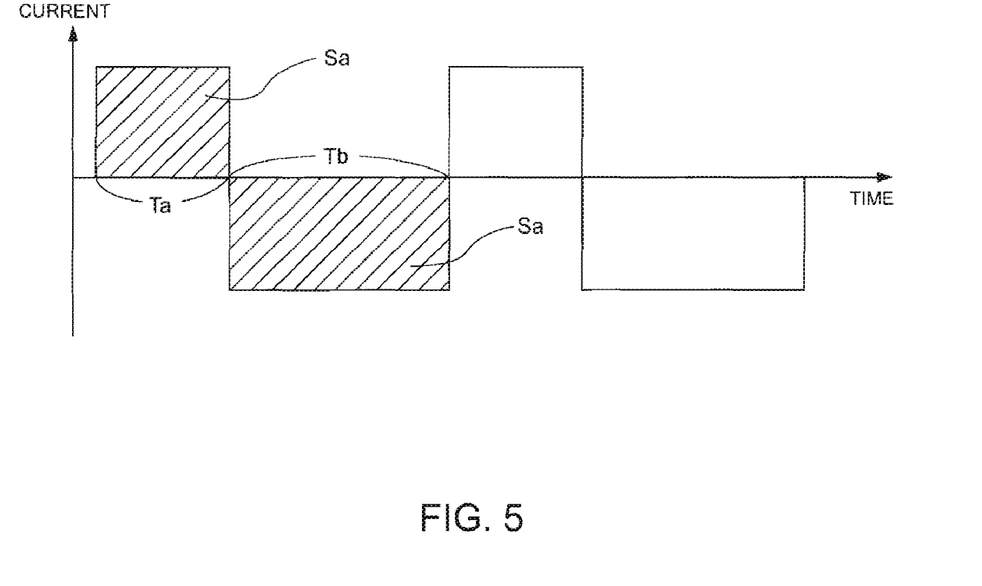
FIG. 5 is a diagram showing an example of an operating waveform in a control operation of an alternating current by the current drive device according to the first embodiment.

FIG. 5 is a diagram showing an example of an operating waveform in a control operation of an alternating current by the current drive device 70 according to the present embodiment. The graph shown in FIG. 5 shows the value of the current regarding the first electrode 15. Specifically, the period in which the value of the current is positive denotes an anodic term Ta of the first electrode 15 (a cathode term of the second electrode 16), the period in which the value of the current is negative denotes the cathode term Tb of the first electrode 15 (the anodic term of the second electrode 16). As is clear from FIG. 5, the current drive device 70 performs the power control by controlling the time ratio between the anodic term Ta and the cathode term Tb of the first electrode 15. In this case, in particular, the time when the first electrode 15 acts as the anode is set shorter than the time when it acts as the cathode. In other words, in a cycle of the present alternating current, the anodic term Ta of the first electrode 15 is shorter than the cathode term Tb (Ta<Tb). Thus, the supply energy in the anodic term is arranged to be smaller than the supply energy in the cathode term. Here, "supply energy" denotes an accumulated value of the power consumption in a certain time period. Accordingly, "supply energy in the anodic term" denotes the accumulated value of power consumption in the period when the first electrode 15 acts as the anode. Similarly, "supply energy in the cathode term" denotes the accumulated value of power consumption in the period when the first electrode 15 acts as the cathode. For example, in the case with the graph having pulse-like rectangular waveform as shown in FIG. 5, regarding each of the supply energy, the areas Sa, Sb of the rectangles respectively formed when the current value is positive and when the current value is negative each correspond to one of the accumulated values. Therefore in this case, it is controlled so as to satisfy Sa<Sb.

As described above, by performing such power control by the current drive device 70, the damage caused by the arc discharge itself on the first electrode 15 is made slighter than the damage caused on the second electrode 16. Thus, the damage caused by the reflected beams from the secondary mirror 3, which is apt to be caused more easily on the first electrode 15, can be balanced out, thereby uniformizing the damages caused on the respective electrodes 15, 16. Therefore, it becomes possible to prevent that the deterioration of only one of the electrodes 15, 16 progresses earlier, thereby lengthen the life of the light source device 100 as a whole.

It should be rioted that the determination of the time ratio can be performed based on the statistically obtained degrees of the damages caused by the reflected beams by the secondary mirror 3 on the first and second electrodes 15, 16. The current drive device 70 thus configured as described above can perform the power control so that the supply energy in the anodic term of the first electrode 15 becomes smaller than the supply energy in the cathode term in the discharge at the pair of electrodes 15, 16 at a desired ratio.

Figure 6:
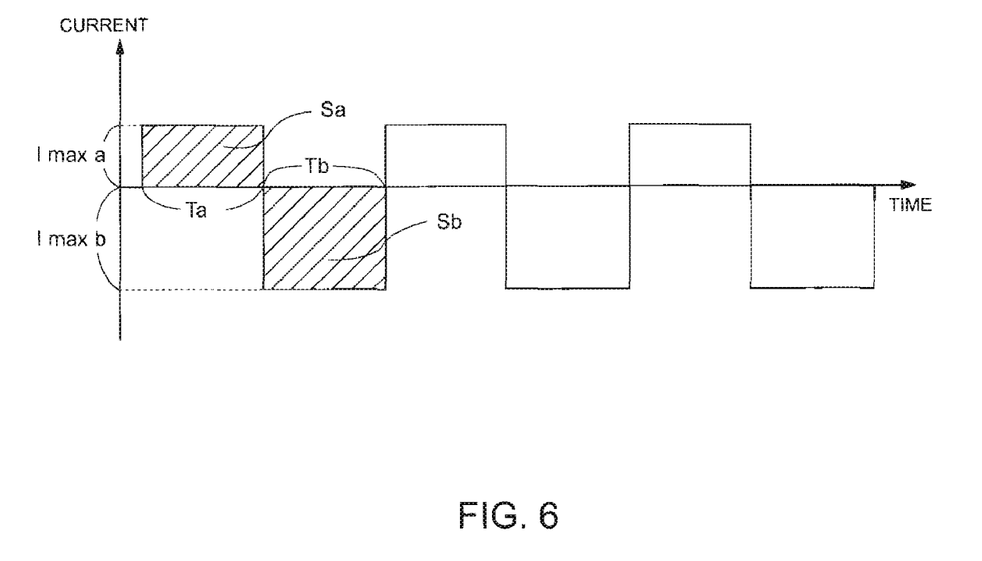
FIG. 6 is a diagram showing another example of the operating waveform in the control operation of the alternating current by the current drive device according to the first embodiment.

Further, as an alternative, for example, as shown in FIG. 6, it is possible to perform the power control by controlling the current ratio in the anodic term Ta and the cathode term Tb of the first electrode 15. More specifically, in the case shown in FIG. 6, peak current values $I_{max}a$, $I_{max}b$, the maximum absolute values of the respective currents in the anodic term and the cathode term, are arranged that the peak current value $I_{max}a$ in the anodic term is smaller than the peak current value $I_{max}b$ in the cathode term ($I_{max}a<I_{max}b$). In this case, for example, even if the anodic term Ta and the cathode term Tb are set equal to each other (Ta=Tb), the areas Sa, Sb representing the supply energy can be set to satisfy Sa<Sb. It should be noted that the adjustment can be performed on both the terms Ta, Tb and the peak current values $I_{max}a$, $I_{max}b$. In either case, the power control can be performed so that the supply energy in the anodic term of the first electrode 15 becomes smaller than the supply energy in the cathode term at a desired rate.

Figure 7:
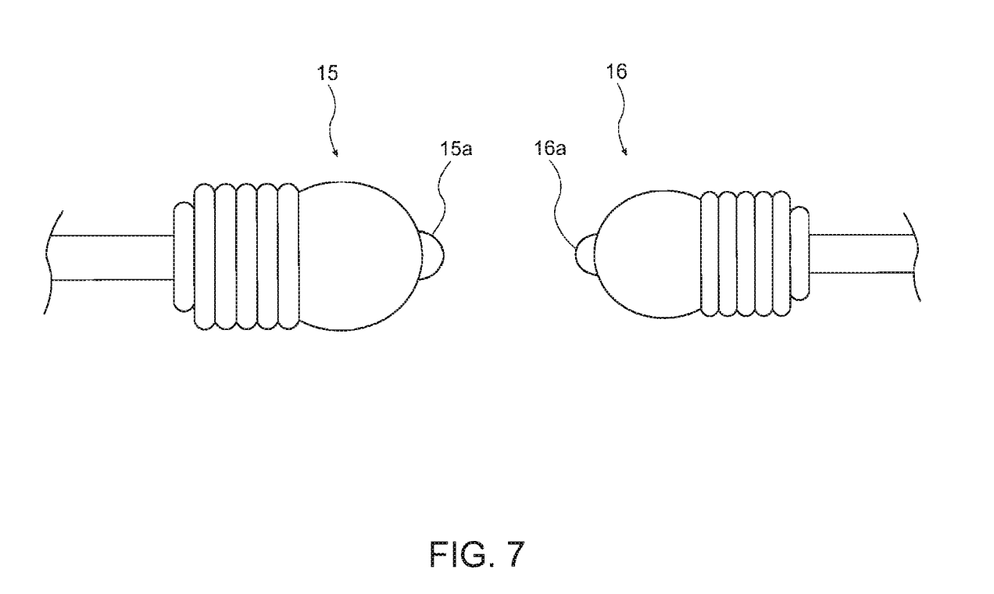
FIG. 7 is an enlarged view showing another example of the peripheries of the tips of the pair of electrodes according to the first embodiment.

Further, in addition to the technology described above, for example, as shown in FIG. 7, the size of the tip section 15a and the periphery thereof of the first electrode 15 can be made larger than the size of the tip section 16a and the periphery thereof of the second electrode 16. In this case, since the thermal capacity of the first electrode 15 is increased, the temperature rise is more hardly caused than in the case of the second electrode 16, thus the resistance to the damage caused by the arc discharge can be improved. Even in such a case, if there is a difference taking the degree of the damage caused by the reflected beams by the secondary mirror 3, the statistic measurement is performed, and based on the result, a difference can be provided between the supply energy in the anodic term of the first electrode 15 and the supply energy in the cathode term similarly to the above. In this case, the difference in the supply energy can be smaller in comparison with the case in which the sizes of the respective electrodes are the same. Further, in this case, for example, the size of the first electrode 15 is preferably kept within the range not for blocking the light beam generated by the arc discharge to maintain the efficiency of the light beam, and accordingly, the difference in the supply energy can be controlled taking this point into consideration.

It should be noted that as the lamp used for the light source unit 10 in the light source device explained hereinabove, various kinds such as a high-pressure mercury vapor lamp or a metal halide lamp can be considered.

Further, although in the present embodiment, the voltage and the current applied by the current drive device 70 both have rectangular waveforms, the waveforms are not limited thereto, but can be, for example, triangular waves.

Second Embodiment

The light source device is explained as the first embodiment of the invention, and as a second embodiment of the invention, in turn, a projector implementing the light source device according to the embodiment of the invention will hereinafter be explained.

Figure 8:
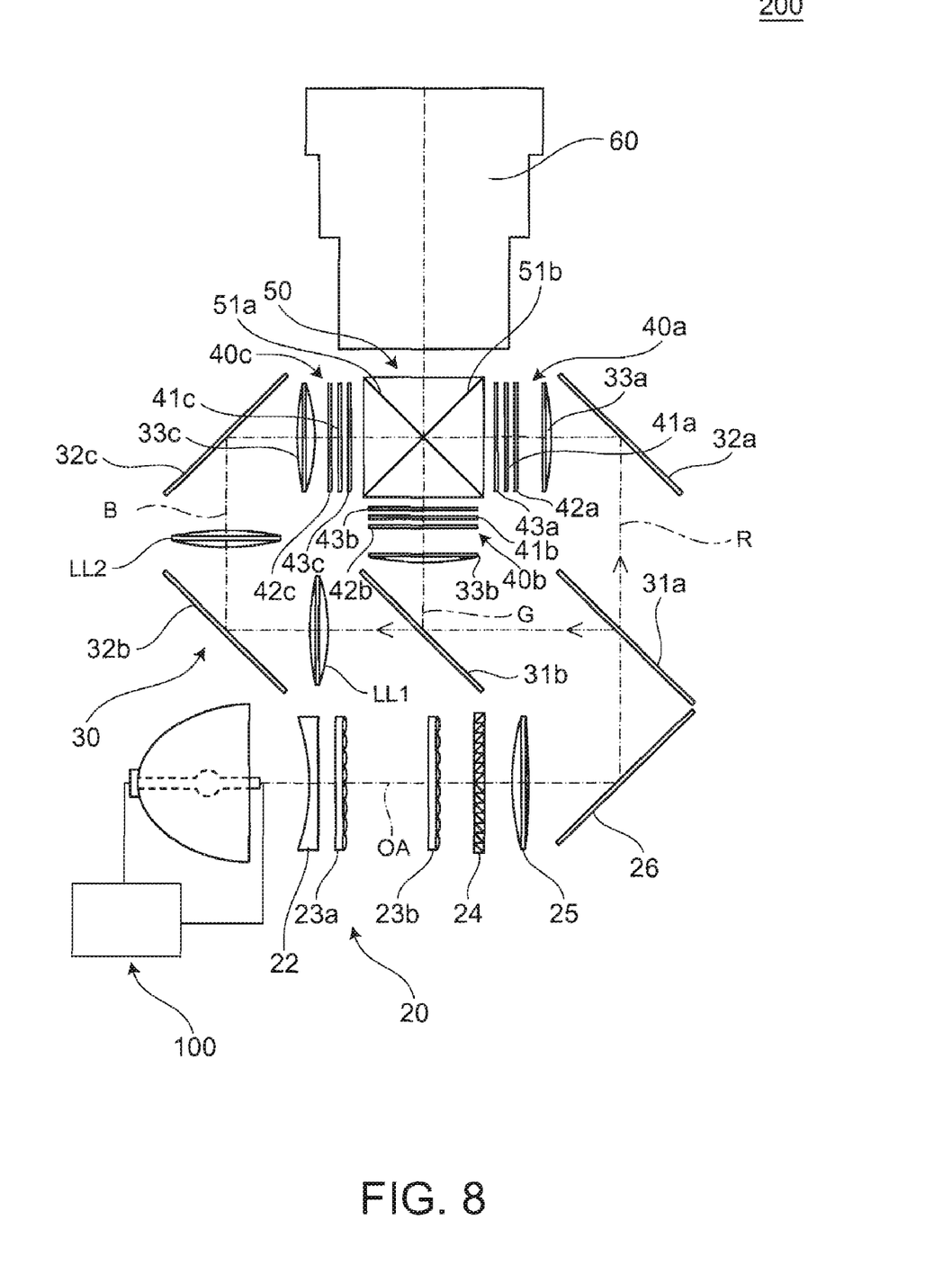
FIG. 8 is a conceptual diagram for explaining a projector according to a second embodiment.

FIG. 8 is a conceptual diagram for explaining the projector according to a second embodiment. The projector 200 in the present embodiment is provided with a light source device 100 as the light source device, an illuminating optical system 20, a color separating optical system 30, liquid crystal light valves 40a, 40b, and 40c as light modulation devices, a cross dichroic prism 50, and a projection lens 60. It should be noted that the light source device 100 is the same as in the first embodiment, and accordingly, the explanations therefor will be omitted.

The illuminating optical system 20 is provided with a collimating lens 22 as a light collimating section for collimating the beam direction of the light, first and second fly-eye lenses 23a, 23b as a pair of fly-eye lenses forming an integrator optical system for dividing and then overlapping the light, a polarization conversion element 24 for aligning the polarization direction of the light, an overlapping lens 25 for overlapping the light transmitted through the both fly-eye lenses 23a, 23b, and a mirror 26 for folding the light path of the light, and thus forming the more uniformized illuminating light. In the illuminating optical system 20, the collimating lens 22 converts the beam direction of the light into substantially the parallel direction. The first and second fly-eye lenses 23a, 23b are each composed of a plurality of element lenses disposed in a matrix, and divide the light beam transmitted through the collimating lens 22 and separately collects or diffuses the light beam with these element lenses. The polarization conversion element 24 is formed of a PBS array, and, has a role of aligning the polarization directions of the partial beams divided into by the first fly-eye lens 23a into a linear polarization of a single direction. The overlapping lens 25 arbitrarily collects the illuminating light as a whole, which is transmitted through the polarization conversion element 24, thus, making the overlapping illumination to the liquid crystal light valves 40a, 40b, and 40c as the posterior light modulation devices of the respective colors possible.

The color separating optical system 30 is provided with first and second dichroic mirrors 31a, 31b, reflecting mirrors 32a, 32b, and 32c, and three field lenses 33a, 33b, and 33c, and separates the illuminating light formed by the illuminating optical system 20 into three colors, red (R), green (G), and blue (B), and at the same time, guides the respective colored light beams to the liquid crystal light valves 40a, 40b, and, 40c. In more details, firstly the first dichroic mirror 31a transmits the R beam and reflects the G beam and the B beam out of the beams of the three colors RGB. Further, the second dichroic mirror 31b reflects the G beam and transmits the B beam out of the two colors of GB. Then, in the color separating optical system 30, the R beam transmitted through the first dichroic mirror 31a enters the field lens 33a for adjusting the incident angle via the reflecting mirror 32a. Further, the G beam, which is reflected by the first dichroic mirror 31a and further reflected also by the second dichroic mirror 31b, enters the field lens 33b for adjusting the incident angle. Further, the B beam passing through the second dichroic mirror 31b enters the field lens 33c for adjusting the incident angle via the relay lenses LL1, LL2, and the reflecting mirrors 32b, 32c.

The liquid crystal light valves 40a, 40b, and 40c are passive tilde of light modulation devices for modulating the spatial intensity distribution of the incident illuminating light beams, and are provided with three liquid crystal panels 41a, 41b, and 41c to be illuminated corresponding to the respective colored light beams emitted from the color separating optical system 30, three first polarization filters 42a through 42c respectively disposed on the entrance side of the liquid crystal panels 41a through 41c, and three second polarization filters 43a through 43c respectively disposed on the exit side of the liquid crystal panels 41a through 41c. The R beam transmitted through the first dichroic mirror 31a enters the liquid crystal light valve 40a via the field lens 33a and so on, and illuminates the liquid crystal panel 41a of the liquid crystal light valve 40a. The G beam reflected by both the first and second dichroic mirrors 31a, 31b enters the liquid crystal light valve 40b via the field lens 33b and so on, and illuminates the liquid crystal panel 41b of the liquid crystal light valve 40b. The B beam reflected by the first dichroic mirror 31a, and transmitted through the second dichroic mirror 31b enters the liquid crystal light valve 40c via the field lens 33c and so on, and illuminates the liquid crystal panel 41c of the liquid crystal light valve 40c. Each of the liquid crystal panels 41a through 41c modulates the spatial intensity distribution or the incident illuminating light, and the three colors of beams respectively entering the liquid crystal panels 41a through 41c are respectively modulated in accordance with the drive signals or image signals input to the respective liquid crystal panels 41a through 41c as electric signals. In this case, the polarization directions of the illuminating light beams entering the respective liquid crystal panels 41a through 41c are adjusted by the first polarization filters 42a through 42c, and at the same time, the modulated beams with predetermined polarization directions are taken out from the modulated beams emitted from the respective liquid crystal panels 41a through 41c by the second polarization filter 43a through 43c. According to the above processes, the liquid crystal light valves 40a, 40b, and 40c form image beams of the respective colors.

The cross dichroic prism 50 combines the mage beams of the respective colors from the liquid crystal light valves 40a, 40b, and 40c. In further details, the cross dichroic prism 50 has a substantially square planar shape formed of four rectangular prisms bonded with each other, and on the interfaces on which the rectangular prisms are bonded with each other, there are formed a pair of dielectric multilayer films 51a, 51b intersecting with each other forming an X-shape. One of the pair of dielectric multilayer films, the first dielectric multilayer film 51a, reflects the R light while the other of the pair of dielectric multilayer films, the second dielectric multilayer film 51b, reflects the B light. The cross dichroic prism 50 reflects the R beam from the liquid crystal light valve 40a by the dielectric multilayer film 51a to emit the R beam towards right side in the traveling direction, makes the G beam from the liquid crystal light valve 40b travel straight to be emitted via the dielectric multilayer films 51a, 51b, and reflects the B beam from the liquid crystal light valve 40c by the dielectric multilayer film 51b to emit the B beam towards left side in the traveling direction. In this way, the R beam, the G beam, and the B beam are combined by the cross dichroic prism 50, and the composite beam as the image beam corresponding to the color image can be formed.

The projection lens 60 magnifies the image beam by the composite beam formed through the cross dichroic prism 50 at a desired magnification, and projects the color image on a screen (not shown).

Since the projector 200 according to the present embodiment uses the light source device 100 explained as the first embodiment, the early deterioration can be prevented, and the life is lengthened, and accordingly, the number of times of replacements can be reduced.

It should be noted that the invention is not limited to the embodiments described above, but can be put into practice in various forms within the scope or the spirit of the invention, and the following modifications, for example, are also possible.

Although in the projector 200 of the above embodiment, a pair of fly-eye lenses 23a, 23b is used for dividing the light beam from the light source device 100 into a plurality of partial light beams, the invention can also be applied to the projectors, which do not use the fly-eye lens, namely the lens array. Further, the fly-eye lenses 23a, 23b can also be replaced with a rod integrator.

Further, although in the projector 200, the polarization conversion element 24 for converting the beam from the light source device 100 into a polarized beam with a specified direction is used, the invention can also be applied to the projectors which do not use such a polarization conversion element 24.

Further, although in the embodiment described above, an example of the case in which the invention is applied to the transmissive projector is explained, the invention can also be applied to reflective projectors. It should be noted here that "transmissive" denotes that the liquid crystal light valve including the liquid crystal panel is a type of transmitting a light beam, and "reflective" denotes that the liquid crystal light valve is a type of reflecting a light beam. In the case with the reflective projector, the liquid crystal light valve can be composed only of the liquid crystal panel, and accordingly, the pair of polarization filters can be eliminated. It should be noted that the light modulation device is not limited to the liquid crystal panel or the like, but can be a light modulation device using micro-mirrors, for example.

Further, as the projector, a front projector performing image projection form a direction of observing the projection screen and a rear projector performing image projection from the opposite direction of observing the projection screen can be cited, and the configuration of the projector shown in FIG. 8 can be applied to the both types of projectors.

Further, although in the embodiment described above, the projector 200 using three liquid crystal panels 41a through 41c is only cited, the invention can also be applied to a projector using only one liquid crystal panel, a projector using two liquid crystal panels, or a projector using four or more of liquid crystal panels.

The entire disclosure of Japanese Patent Application No. 2006-286534, filed Oct. 20, 2006 is expressly incorporated by reference herein.

What is claimed is:

1. A light source device comprising:
   first and second electrodes that produces luminescence by discharge;
   an arc tube having a main body section having a discharge space in which the first and second electrodes are disposed with a distance and a sealing section disposed on each of the both ends of the main body section;
   a primary reflecting mirror disposed on the side of the first electrode, and that reflects a light generated by discharge between the first and second electrodes to emit the light towards an area to be illuminated;
   a secondary reflecting mirror disposed on the side of the second electrode facing the primary reflecting mirror, and that reflects the light towards the side of the primary reflecting mirror; and
   a current drive device that generates an alternating current for causing the discharge between the first and second electrodes, and that performs power control, by controlling the alternating current so that supplying energy in an anodic term of the first electrode becomes smaller than supplying energy in a cathode term.

2. The light source device according to claim 1
   wherein the current drive device performs the power control by adjusting a time ratio between the anodic term and the cathode term of the first electrode.

3. The light source device according to claim 1
   wherein the current drive device performs the power control by adjusting a current ratio between the current in the anodic term and the current in the cathode term of the first electrode.

4. The light source device according to claim 1
   wherein the primary reflecting mirror and the secondary reflecting mirror have reflecting curved surfaces substantially axisymmetric with respective to an optical axis, and
   electrode axes of the first and second electrodes are disposed substantially identical to the optical axis.

5. A projector comprising:
   the light source device according to claim 1;
   a light modulation device illuminated by an illuminating light beam from the light source device; and
   a projection optical system that projects an image obtained via the light modulation device.

6. The projector according to claim 5
   wherein the current drive device performs the power control by adjusting a time ratio between the anodic term and the cathode term of the first electrode.

7. The projector according to claim 5
   wherein the current drive device performs the power control by adjusting a current ratio between the current in the anodic term and the current in the cathode term of the first electrode.

8. The projector according to claim 5
   wherein the primary reflecting mirror and the secondary reflecting mirror have reflecting curved surfaces substantially axisymmetric with respective to an optical axis, and
   electrode axes of the first and second electrodes are disposed substantially identical to the optical axis.

\* \* \* \* \*